Dec. 31, 1963 J. DAWSON 3,116,457
ELECTRICAL PULSE COUNTING DEVICES
Filed Aug. 18, 1960 2 Sheets-Sheet 1

INVENTOR
JOHN DAWSON
BY Craig and Freudenberg
ATTORNEYS

INVENTOR
JOHN DAWSON
BY
Craig and Freudenberg
ATTORNEYS

United States Patent Office 3,116,457
Patented Dec. 31, 1963

3,116,457
ELECTRICAL PULSE COUNTING DEVICES

John Dawson, Beeston, Nottingham, England, assignor to Ericsson Telephones Limited, London, England, a British company Filed Aug. 18, 1960, Ser. No. 50,354
Claims priority, application Great Britain Aug. 21, 1959
5 Claims. (Cl. 328—44)

Figure 1:
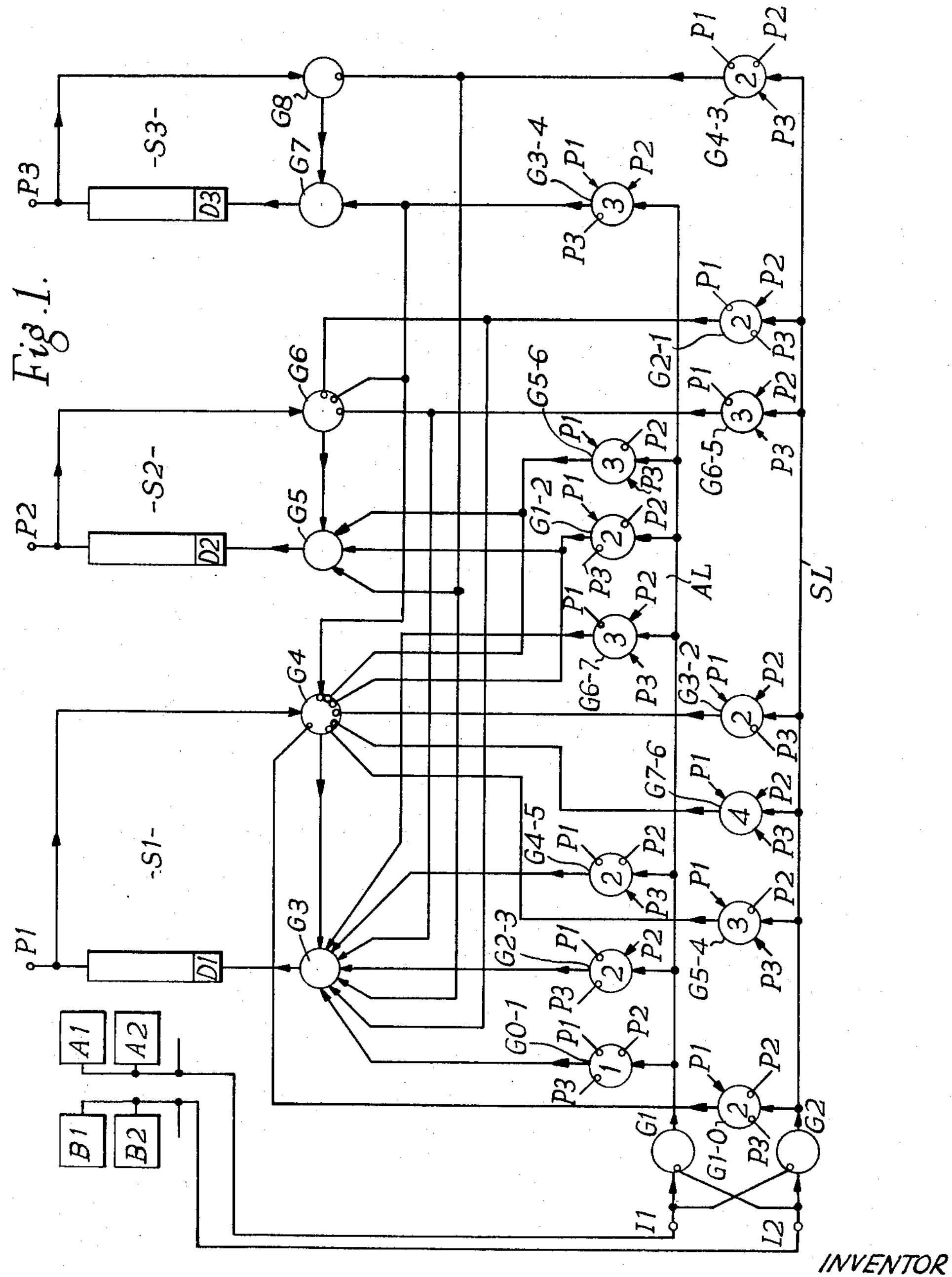

The present invention relates to electrical pulse-counting devices and is concerned with circuits for counting pulses of the type which occur only in periodically recurring intervals of time, hereinafter referred to as pulse intervals, each pulse substantially occupying the interval in which it occurs. A pulse may be present in, or absent from, any pulse interval. If T is the repetition period of the pulse intervals the interval between successive pulses to be counted will therefore be T, 2T or in general $m$T where $m$ is an integer.

My application No. 797,284 is concerned with such pulse-counting devices and the present invention is an improvement in or modification of the invention in respect of which the said application was made.

The counter described in the specification of the said application comprises a plurality of pulse stores, each store including a delay device having its output connected to its input by a feedback loop including gating means adapted to permit and prevent circulation of pulses in the store, the delay time of each device being equal to the repetition period of the pulse intervals. As each pulse interval comes round, the count held by the counter is represented in a predetermined code, binary for example, by the pattern in which pulses appear at output terminals of the stores and this pattern is appropriately modified in each pulse interval in which there occurs a pulse to be added or subtracted.

As explained in the specification referred to, a number of counts of pulses from different sources may be held in the one counting device by interlacing the pulse intervals of the different counts and sources.

The counter described in the said specification further comprises a plurality of gating circuits associated with the stores respectively and a pulse to be added or subtracted passes sequentially through as many of the stores as are appropriate to the addition or subtraction being performed, thereby effecting, through the relevant gating circuits, the necessary change in the pattern in which pulses circulate in the stores and hence appear at the output terminals of the stores in the relevant pulse interval. Thus devices according to the invention of the said application are characterised by a series mode of operation and consequently by slowness of operation. Devices according to the present invention are characterised by a parallel mode of operation and are hence much quicker in their functioning.

It will be appreciated that, whatever symbolism or terminology is used to describe the operations of a pulse counter in different specific applications, it is possible to describe the operations of the counter in response to pulses from one source either as additive counting from 0 to an upper limit integer $n$ or subtractive counting from $n$ to 0. When two contradictory pulse sources are involved the operations of the counter can be described as additive and subtractive counting between 0 and $n$, the count in the counter being representative of the difference between the numbers of contradictory pulses. This is merely a matter of definition and, in this specification, counters will be described and defined solely in terms of additive and subtractive counting as set out above for convenience.

An "add" pulse conveys the information, "change the state of the stores so that the pattern of circulating pulses is representative of the number $r+1$ where the previously obtaining pattern represented the number $r$". Thus one step of addition takes place in response to an add pulse. In all, where the device can count from 0 to $n$ there are $n$ different steps of addition which can take place: the step 0 to 1, the step 1 to 2, the step 2 to 3 and so on up to the steps $n-2$ to $n-1$ and $n-1$ to $n$. Likewise, where the device can count from $n$ to 0 there are $n$ different steps of subtraction: the step $n$ to $n-1$ and so on to the step 1 to 0.

According to one aspect of the present invention there is provided a pulse-counting device adapted to count additively pulses of the type hereinbefore defined up to a number $n$ and comprising a plurality of pulse stores, each store including a delay device having its output connected to its input by a feedback loop including gating means adapted normally to permit and, when operated, to prevent, circulation of pulses in the store, the delay time of each delay device being equal to the repetition period of the said pulse intervals and each of the numbers 0 to $n$ being represented by a different pattern in which pulses appear at output terminals of the stores in the pulse intervals, the device further comprising $n$ gating circuits corresponding respectively to the $n$ different steps of addition which can be performed in the device and each having a first input terminal connected in common to a terminal to which, in operation, the pulses to be added are applied, the gating circuit corresponding to the step of addition $r$ to $r+1$, where $r$ is any number from 0 to $n-1$, having an output terminal connected to such an input or inputs of the delay device(s) and/or such an operating terminal or terminals of the gating means of one store or different ones of the stores that, on the appearance of an output pulse at the said output terminal, the pattern at which pulses appear at output terminals of the stores is changed from that representing the number $r$ to that representing the number $r+1$ and further having one or more further input terminals connected to the output or outputs respectively of different stores and in each case requiring the presence or absence of a pulse at the output to which the terminal is connected if any output pulse is to appear at the output terminal of the gating circuit. The arrangement being such that an output pulse can only be caused to appear by a pulse to be added when the count in the device is $r$.

According to another aspect of the invention there is provided a pulse-counting device adapted to count subtractively pulses of the type hereinbefore defined down from a number $n$ and comprising a plurality of pulse stores, each store including a delay device having its output connected to its input by a feedback loop including gating means adapted normally to permit and, when operated, to prevent, circulation of pulses in the store, the delay time of each delay device being equal to the repetition period of the said pulse intervals and each of the numbers 0 to $n$ being represented by a different pattern in which pulses appear at output terminals of the stores in the pulse intervals, the device further comprising $n$ gating circuits corresponding respectively to the $n$ different steps of subtraction which can be performed in the device and each having a first input terminal connected in common to a terminal to which, in operation, the pulses to be subtracted are applied, the gating circuit corresponding to the step of subtraction $r$ to $r-1$, where $r$ is any number from 1 to $n$ having an output terminal connected to such an input or inputs of the delay device(s) and/or such an operating terminal or terminals of the gating means of one store or different ones of the stores that, on the appearance of an output pulse at the said output terminal, the pattern at which pulses appear at output terminals of the stores is changed from that representing the number $r$ to that representing the number $r-1$ and further having one or more further input terminals connected to the output or outputs respectively of different stores and in each case requiring the presence or absence of a pulse at the output to which the terminal is connected if any output pulse is to appear at the output terminal of the gating circuit, the arrangement being such that an output pulse can only be caused to appear by a pulse to be subtracted when the count in the device is $r$.

A pulse-counting device for the additive and subtractive counting of pulses from two contradictory sources respectively may embody the features of the invention in both its aspects, there being associated with one set of stores a first $n$ gating circuits corresponding to the $n$ different steps of addition which can be performed and a second $n$ gating circuits corresponding to the $n$ different steps of subtraction which can be performed in the device.

Before proceeding with a detailed description of two embodiments of the invention some consideration will be given to the nature of the gating circuits employed in counting devices according to the invention. It will be understood from the foregoing that each gating circuit performs only one specific function and that it only performs that function when a particular count $r$ is held in the stores. The specific function consists of at least the removal of a pulse from one store or the launching of a pulse in one store, but may consist of removing and launching pulses in several stores. In each case however the gating circuit has its output terminal connected to the input of any store in which a pulse is to be launched and to the operating terminal of the gating means of any store in which a pulse is to be removed when that gating circuit performs its function.

Gating circuits are circuits adapted to perform certain logical functions, and in order that a gating circuit will only provide an output when a particular count $r$ obtains, it must have built into it a specification of conditions which are at least sufficient to ensure that the count $r$ obtains and which are preferably necessary and sufficient, in order that circuit components may be conserved. These conditions will be expressed in the form "there must be an input pulse present on the input terminal common to all the $n$ gating circuits, and the first store has/has not a pulse present at its output, and the second store has/has not a pulse present at its output, and so on." Where there must be a pulse present at the output of a particular store that output is connected to an input of the gating circuit which must be energised before the gating circuit can produce an output. Where there must not be a pulse present at the output of a particular store that output is connected to an input of the gating circuit which when energised inhibits the production of an output by the gating circuit. These general considerations will be illustrated by the succeeding description, which will not however include circuit details of gating circuits. Gating circuits capable of performing the logical functions specified are well known.

Figure 2:
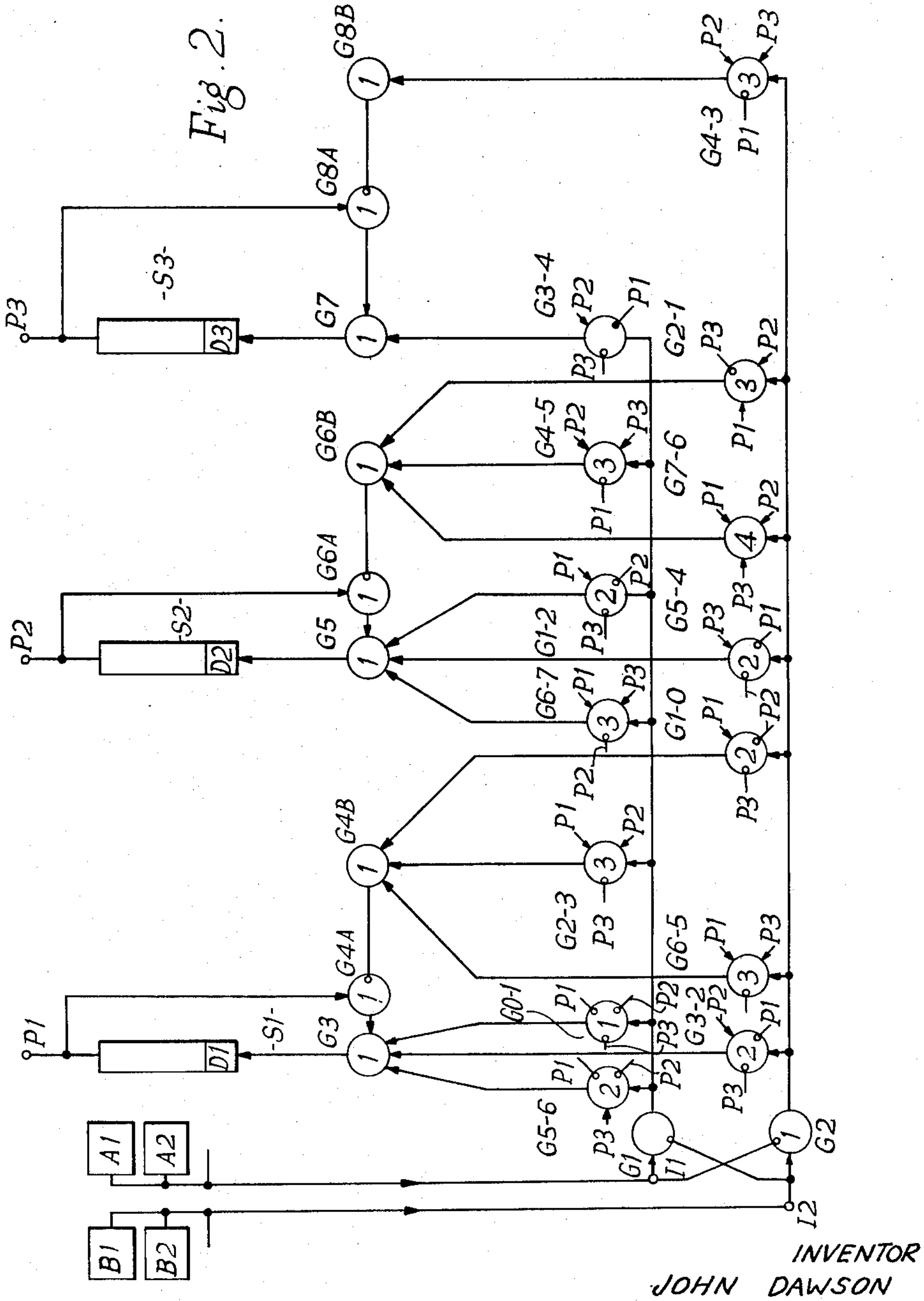

The invention will now be further described by way of example with reference to the accompanying drawings in which FIGS. 1 and 2 are block circuit diagrams of two embodiments of the invention respectively.

FIG. 1 shows a counting device comprising three stores S1, S2 and S3. The store S1 consists of a delay line D1 having its output connected to a store output terminal P1 and through an inhibit gate G4 to the store input, comprising a 1-gate G3, the energisation of any input to which causes the launching of a pulse in the delay line D1. The latter includes pulse reshaping circuits for reshaping the pulses which circulate round the loop G3, D1, G4, G3.

It should here be mentioned that gates are indicated by rings, ordinary inputs to the gates by arrows terminating on the rings and inhibiting inputs (the energisation of any one of which prevents an output appearing at the output terminal of the gate) by small circles just inside the rings. A numeral in a ring specifies the number of ordinary arrowed inputs which must be energised before an output appears.

The device counts in binary scale as shown in Table I below:

*Table I*

| Number $r$ | Binary form | State of stores: outputs appear on— | | |
|---|---|---|---|---|
| | | P3 | P2 | P1 |
| 0 | 000 | 0 | 0 | 0 |
| 1 | 001 | 0 | 0 | 1 |
| 2 | 010 | 0 | 1 | 0 |
| 3 | 011 | 0 | 1 | 1 |
| 4 | 100 | 1 | 0 | 0 |
| 5 | 101 | 1 | 0 | 1 |
| 6 | 110 | 1 | 1 | 0 |
| 7 | 111 | 1 | 1 | 1 |

In this table "1" represents the presence and "0" the absence of a pulse at a store output. It will be seen that the stores S1, S2 and S3 correspond to the first, second and third binary digits respectively.

The gating device has input terminals I1 and I2. A number of sources A1, A2 . . . of add pulses are connected to the terminal I1 and a number of sources B1, B2 . . . of subtract pulses are connected to the terminal I1.

The sources A1 and B1 form a pair of contradictory sources which produce pulses only in first pulse intervals, which are interleaved with pulse intervals pertaining to other pairs A2, B2, etc. of contradictory sources. It is clear that the operation of the device only need be described as if there were one pair A1, B1 of sources connected to I1 and I2.

The terminal I1 is connected to an add line AL through an inhibit gate G1 and to the inhibitory input of an inhibit gate G2 through which the terminal I2 is connected to a subtract line SL. I2 is also connected to the inhibitory input of G1. It will be apparent that should A1 and B1 both produce a pulse in one pulse interval both gates G1 and G2 will be shut and no pulses will pass to the lines AL and SL. Otherwise an add pulse passes to the line AL and a subtract pulse to the line SL.

The add line AL is connected to an input of each of seven gates corresponding to the seven different steps of addition 0 to 1, 1 to 2 and so on to 6 to 7 and designated G0–1, G1–2 . . . G6–7 accordingly.

These seven gates each have a number of ordinary and inhibitory inputs connected to the terminals P1 to P3 but to avoid undue complication the inputs are merely shown with the reference of the output terminal to which they are connected by them.

The gate G0–1 has three inhibitory inputs connected to P1, P2 and P3 and will not produce an output when a pulse is present on any one of P1, P2 and P3. Hence G0–1 only produces an output when the number in the counter is 0. Then an add pulse will produce an output which is applied solely to G3 to launch a pulse in S1.

G1–2 is a 2-gate and has inhibitory inputs connected to P2 and P3 and an ordinary input to P1. G1–2 only produces an output when the number in the counter is 1 (001 in binary code) and then applies a pulse to G4 (which arrests the pulse launched in D1) and to G5 which launches a pulse in D2. The number 2 (010) is thus stored. G2–3 has inhibitory inputs connected to P1 and P3 and an ordinary input connected to P2 and will only produce an output when the counter stores 2 (010). Then its output is applied solely to G3 to launch a pulse in D1, whereby 3 (011) is stored in the counter.

The connections of gates G3–4 and so on will not be described, but by examination of FIG. 1, particularly in comparison with Table I, it will be seen that every gate $Gr-(r+1)$ will only produce a count when the counter stores $r$ and will then change the number stored from $r$ to $r+1$.

A complementary series of gates G7–6, G6–5 . . . G1–0 are connected to the subtract line SL and perform the seven steps of subtraction, the converse of the steps of addition referred to. By way of example the connections and operation of G4–3 will be considered. G4–3 is a 2-gate with an ordinary input connected to P3 (in addition to the ordinary input connected to SL). Inhibitory inputs are connected to P1 and P2. Hence G4–3 will only produce an output if the counter is storing the number 4 (100). When it does produce an output a connection to G8 arrests the pulse in S3 and launches pulses in D1 and D2. Hence the number stored is changed to 3 (011).

The counting device shown in FIG. 2 is basically the same as that shown in FIG. 1 but it will be seen that simplication has been achieved in that each gate G0–1 to G6–7 and G7–6 to G1–0 has its output connected to one store only. This has been achieved by utilising a modified binary code in which the order of the binary numbers has been changed as follows.

*Table II*

| Number: | Binary form |
|---|---|
| 0 | 000 |
| 1 | 001 |
| 2 | 011 |
| 3 | 010 |
| 4 | 110 |
| 5 | 100 |
| 6 | 101 |
| 7 | 111 |

Consideration of Table II will show that each additive or subtractive step only involves a change of one binary digit with this modified code. The ensuing simplification is of considerable benefit.

Another modification lies in the stores S1 to S3. Taking S1, the inhibit gate G4 with several inhibitory inputs has been replaced by a gate G4A with only one inhibitory input coupled to the output of a 1-gate G4B to which are connected the output terminals of gates controlling the arresting of pulses in S1.

I claim:

1. A pulse counting device adapted to count additively pulses of the type hereinbefore defined up to a number $n$ and comprising a plurality of pulses stores, each store including a delay device having its output connected to its input by a feedback loop including gating means adapted normally to permit and, when operated, to prevent, circulation of pulses in the store, the delay time of each delay device being equal to the repetition period of the said pulse intervals and each of the numbers 0 to $n$ being represented by a different pattern in which pulses appear at output terminals of the stores in the pulse intervals, the device further comprising $n$ gating circuits corresponding respectively to the $n$ different steps of addition which can be performed in the device and each having a first input terminal connected in common to a terminal to which, in operation, the pulses to be added are applied, the gating circuit corresponding to the step of addition $r$ to $r+1$, where $r$ in any number from 0 to $n-1$, having an output terminal connected selectively to such an input or inputs of the delay device(s) and such an operating terminal or terminals of the gating means of one store or different ones of the stores that, on the appearance of an output pulse at the said output terminal, the pattern at which pulses appear at output terminals of the stores is changed from that representing the number $r$ to that representing the number $r+1$ and further having one or more further input terminals connected to the output or outputs respectively of different stores and in each case requiring the presence or absence of a pulse at the output to which the terminal is connected if any output pulse is to appear at the output terminal of the gating circuit, the arrangement being such that an output pulse can only be caused to appear by a pulse to be added when the count in the device is $r$.

2. A pulse counting device adapted to count subtractively pulses of the type hereinbefore defined down from a number $n$ and comprising a plurality of pulse stores, each store including a delay device having its output connected to its input by a feedback loop including gating means adapted normally to permit and, when operated, to prevent, circulation of pulses in the store, the delay time of each delay device being equal to the repetition period of the said pulse intervals and each of the numbers 0 to $n$ being represented by a different pattern in which pulses appear at output terminals of the stores in the pulse intervals, the device further comprising $n$ gating circuits corresponding respectively to the $n$ different steps of subtraction which can be performed in the device and each having a first input terminal connected in common to a terminal to which, in operation, the pulses to be subtracted are applied, the gating circuit corresponding to the step of subtraction $r$ to $r-1$, where $r$ is any number from 1 to $n$, having an output terminal connected selectively to such an input or inputs of the delay device(s) and such an operating terminal or terminals of the gating means of one store or different ones of the stores that, on the appearance of an output pulse at the said output terminal, the pattern at which pulses appear at output terminals of the stores is changed from that representing the number $r$ to that representing the number $r-1$, and further having one or more further input terminals connected to the output or outputs respectively of different stores and in each case requiring the presence or absence of a pulse at the output to which the terminal is connected if any output pulse is to appear at the output terminal of the gating circuit, the arrangement being such that an output pulse can only be caused to appear by a pulse to be subtracted when the count in the device is $r$.

3. A pulse counting device for counting pulses of the type hereinbefore defined additively and subtractively within the range 0 to $n$ comprising a plurality of pulse stores, each store including a delay device with input and output and a feedback loop connecting output to input, the feedback loop including gating means normally permitting circulation of pulses in the store but each having an operating terminal for operation to prevent such circulation, the delay time of each delay device being equal to the repetition period of the said pulse intervals, each of the numbers 0 to $n$ being represented by a different pattern in which pulses appear at output terminals of the stores in the pulse intervals, the device further comprising a first $n$ gating circuits corresponding respectively to the $n$ different steps of addition and each having a first input terminal, a first common terminal to which the pulses to be added are applied, means connecting the first common terminal directly to the first input terminals of all $n$ first gating circuits, a second $n$ gating circuits corresponding respectively to the $n$ different steps of subtraction and each having a first input terminal, a second common terminal to which the pulses to be subtracted are applied, and means connecting the second common terminal directly to the first input terminal of all $n$ second gating circuits, the gating circuit corresponding to the step of addition $r$ to $r+1$, where r is any number from 0 to $n-1$, having an output terminal connected selectively to such an input or inputs of the delay device(s) and such an operating terminal or terminals of the gating means of one store or different ones of the stores that, on the appearance of an output pulse at the said output terminal, the pattern at which pulses appear at output terminals of the stores is changed from that representing the number $r$ to that representing the number $r+1$ and further having one or more further input terminals connected to the output or outputs respectively of different stores and in each case requiring the presence or absence of a pulse at the output to which the terminal is connected if any output pulse is to appear at the output terminal of the gating circuits, the arrangement being such that an output pulse can only be caused to appear by a pulse to be added when the count in the device is *r*, the gating circuit corresponding to the step of subtraction *s* to *s*—1, where *s* is any number from 1 to *n*, having an output terminal connected selectively to such an input or inputs of the delay device(s) and such an operating terminal or terminals of the gating means of one store or different ones of the stores that, on the appearance of an output pulse at the said output terminal, the pattern at which pulses appear at output terminals of the stores is changed from that representing the number *s* to that representing the number *s*—1 and further having one or more further input terminals connected to the output or outputs respectively of different stores and in each case requiring the presence or absence of a pulse at the output to which the terminal is connected if any output pulse is to appear at the output terminal of the gating circuits, the arrangement being such that an ouput pulse can only be caused to appear by a pulse to be subtracted when the count in the device is *s*.

4. A device according to claim 3, comprising first inhibiting means responsive to an additive pulse to prevent the passage of a pulse to be subtracted to the said second *n* gating circuits and a second inhibiting means responsive to a subtractive pulse to prevent the passage of a pulse to be added to the said first *n* gating circuits.

5. A pulse counting device adapted to count pulses of the type hereinbefore defined in the range 0 to *n* in a numerical code in which each counting step involves a change of one binary digit only and comprising a plurality of pulse stores, each store including a delay device with output and input and a feedback loop connecting output to input and adapted normally to permit and, when operated, to prevent, circulation of pulses in the store, the delay time of each delay device being equal to the repetition period of the said pulse intervals and each of the numbers 0 to *n* being represented by a different pattern in which pulses appear at output terminals of the stores in the pulse intervals, the device further comprising *n* gating circuits corresponding respectively to the *n* different steps of counting which can be performed in the device and each having a first input terminal, a common terminal to which the pulses to be counted are applied, means connecting all said first input terminals directly to the common terminal, the gating circuit corresponding to the step of counting from *r* to the next number, where *r* is any number in the said range, having an output terminal connected selectively to such an input or inputs of the delay device(s) and such an operating terminal or terminals of the gating means of one store or different ones of the stores that, on the appearance of an output pulse at the said output terminal, the pattern at which pulses appear at output terminals of the stores is changed from that representing the number *r* to that representing the next number and further having one or more furthter input terminals connected to the output or outputs respective of different stores and in each case requiring the presence or absence of a pulse at the output to which the terminal is connected if any output pulse is to appear at the output terminal of the gating circuit, the arrangement being such that an output pulse can only be caused to appear by a pulse to be counted when the count in the device is *r*.

References Cited in the file of this patent

FOREIGN PATENTS 1,162,582 France ---------------- Apr. 14, 1958